United States Patent
Lu et al.

(10) Patent No.: US 7,488,015 B2
(45) Date of Patent: Feb. 10, 2009

(54) VEHICLE SYSTEMS AND METHODS FOR DETECTING PEDESTRIAN IMPACTS

(75) Inventors: Yan Lu, Freising (DE); Xinlin Qing, Mountain View, CA (US); Chang Zhang, Sunnyvale, CA (US); Irene Jhi-Sue Li, Stanford, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 253 days.

(21) Appl. No.: 11/017,717

(22) Filed: Dec. 22, 2004

(65) Prior Publication Data

US 2006/0131900 A1    Jun. 22, 2006

(51) Int. Cl.
*B60R 21/0136* (2006.01)
*B60R 21/34* (2006.01)

(52) U.S. Cl. ............ 293/117; 296/187.03; 296/187.04; 296/187.09

(58) Field of Classification Search ............ 296/187.03, 296/187.04, 187.09, 193.11, 193.09; 180/274, 180/69.21, 271; 293/117; 340/436; 701/45, 701/47; 280/734, 735
See application file for complete search history.

(56) References Cited

U.S. PATENT DOCUMENTS

| | | | |
|---|---|---|---|
| 5,400,032 A * | 3/1995 | Asbury et al. ............. 342/70 |
| 6,169,479 B1 | 1/2001 | Boran et al. | |
| 6,212,456 B1 | 4/2001 | Stride | |
| 6,308,554 B1 * | 10/2001 | Mattes et al. ............. 73/1.37 |
| 6,370,964 B1 | 4/2002 | Chang et al. | |
| 6,559,763 B2 | 5/2003 | Murphy et al. | |
| 6,755,268 B1 * | 6/2004 | Polz et al. ............. 180/69.21 |
| 6,784,792 B2 * | 8/2004 | Mattes et al. ............. 340/436 |
| 7,000,720 B2 * | 2/2006 | Polz et al. ............. 180/69.21 |
| 2002/0178813 A1 * | 12/2002 | Babala ............. 73/504.02 |
| 2003/0146675 A1 * | 8/2003 | Cuhat et al. ............. 310/319 |
| 2003/0178872 A1 | 9/2003 | Lich | |
| 2004/0002815 A1 | 1/2004 | Ishizaki et al. | |
| 2004/0055805 A1 | 3/2004 | Lich et al. | |
| 2004/0059487 A1 * | 3/2004 | Lich et al. ............. 701/45 |
| 2004/0066286 A1 | 4/2004 | Stephan et al. | |
| 2004/0085217 A1 | 5/2004 | Ueda et al. | |
| 2004/0163478 A1 | 8/2004 | Xu et al. | |

FOREIGN PATENT DOCUMENTS

| | | |
|---|---|---|
| DE | 42 37 404 A1 | 5/1994 |
| DE | 198 35 561 A1 | 2/2000 |
| DE | 102 17 031 A1 | 10/2003 |

* cited by examiner

*Primary Examiner*—Glenn Dayoan
*Assistant Examiner*—Gregory Blankenship
(74) *Attorney, Agent, or Firm*—Crowell & Moring LLP

(57) ABSTRACT

Systems and methods for pedestrian impact detection are provided. Piezoelectric sensor elements detect an object impacting a vehicle. The detected signal is attenuated and filtered. The attenuated and filtered signal is analyzed in the frequency domain to determine whether the object which impacted the vehicle is a pedestrian. If the object which impacted the vehicle is a pedestrian, then a pedestrian protection system is deployed.

18 Claims, 6 Drawing Sheets

VEHICLE SYSTEMS AND METHODS FOR DETECTING PEDESTRIAN IMPACTS

BACKGROUND OF THE INVENTION

Motor vehicles are typically equipped with a variety of sensors, some of which are used to activate systems which protect vehicle occupants. These systems are known as passive restraint systems, and include front and side airbags, seatbelt pretensioners, and the like.

Recently investigation has begun on systems which protect pedestrians involved in a vehicle collision. For example, US Patent Application Publication No. 2004/0066286 A1 discloses a system for sensing whether an object, which struck a vehicle, is a pedestrian. If it is determined that a vehicle has struck a pedestrian, the system activates a collision protection apparatus such as an external inflatable member to protect the pedestrian from impacting the vehicle hood, and shifting the hood into a raised position that permits it to absorb forces applied by the pedestrian impact. Whether to deploy the collision protection apparatus depends upon the location and length of the impact to the vehicle.

Another technique for detecting object impact is using a piezoelectric cable sensor. Using this technique, the magnitude of a signal from the piezoelectric cable sensor is compared to a threshold value. If the magnitude is greater than a threshold value, it is determined that a particular type of object has impacted on the sensor. However, due to the overlap in signals between different types of objects, the piezoelectric cable sensor technique is not able to accurately distinguish between different types of objects.

There are two critical components to the aforementioned pedestrian impact protection systems—speed and accuracy of the impact detection. With regard to the speed component, if a decision to deploy a pedestrian impact protection system is not timely, it may not deploy fast enough to provide the desired protection for the pedestrian. Furthermore, due to the costs involved with replacing airbags or resetting other types of pedestrian impact protection systems, it is desirable that these systems are only deployed when there is an actual pedestrian impact. Accordingly, it would be desirable to provide systems and methods for quickly and accurately detecting pedestrian impacts.

SUMMARY OF THE INVENTION

Systems and methods for pedestrian impact detection are provided. In accordance with exemplary embodiments of the present invention, piezoelectric sensor elements detect an object impacting a vehicle. The detected signal is attenuated and filtered. The attenuated and filtered signal is analyzed in the frequency domain to determine whether the object which impacted the vehicle is a pedestrian. If the object which impacted the vehicle is a pedestrian, then a pedestrian protection system is deployed.

BRIEF DESCRIPTION OF THE DRAWING FIGURES

DETAILED DESCRIPTION OF THE PREFERRED EMBODIMENTS

Figure 1:
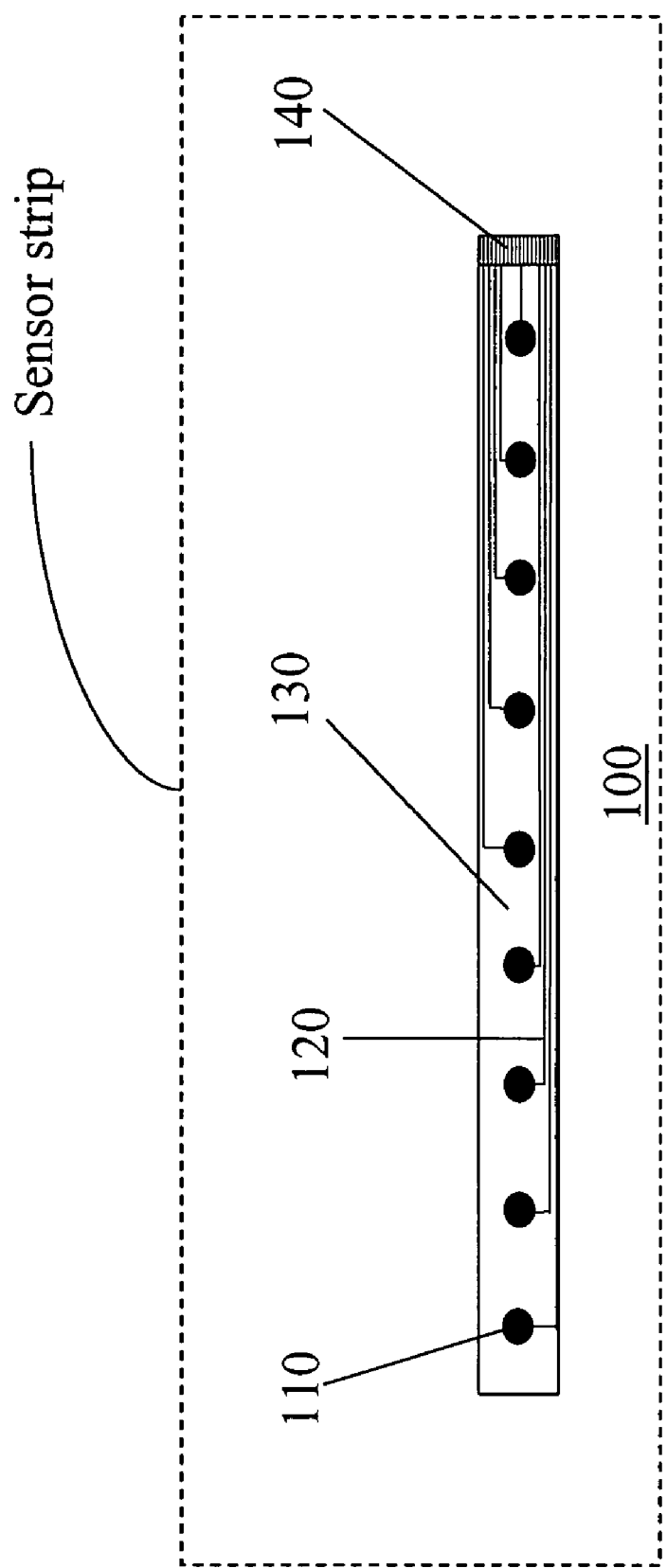
FIG. 1 illustrates an exemplary piezoelectric sensor in accordance with the present invention.

FIG. 1 illustrates an exemplary piezoelectric sensor 100 in accordance with the present invention. The sensor 100 includes a plurality of piezoelectric sensor elements 110 embedded in a dielectric layer 130. Each of the piezoelectric sensor elements 110 are coupled to a connector 140 via a corresponding wire 120. Each of the wires is embedded in the dielectric layer 130. The number of sensor elements 110 can vary depending upon the particular vehicle. Additionally, although the sensor elements are illustrated in a one-dimensional array, THE present invention also includes sensor elements in a two- or three-dimensional array.

The piezoelectric sensor 100 is flexible enough to be integrated into a vehicle bumper (or other appropriate vehicle component) and it is electrically shielded to substantially eliminate effects of electro-magnetic (EM), radio frequency (RF), and other types of electro-magnetic interferences. As used herein, the phrase substantially eliminate is intended to mean minimize interferences which affect identification of object types, while interferences which do not affect the identification of object types may still be present.

Figure 2:
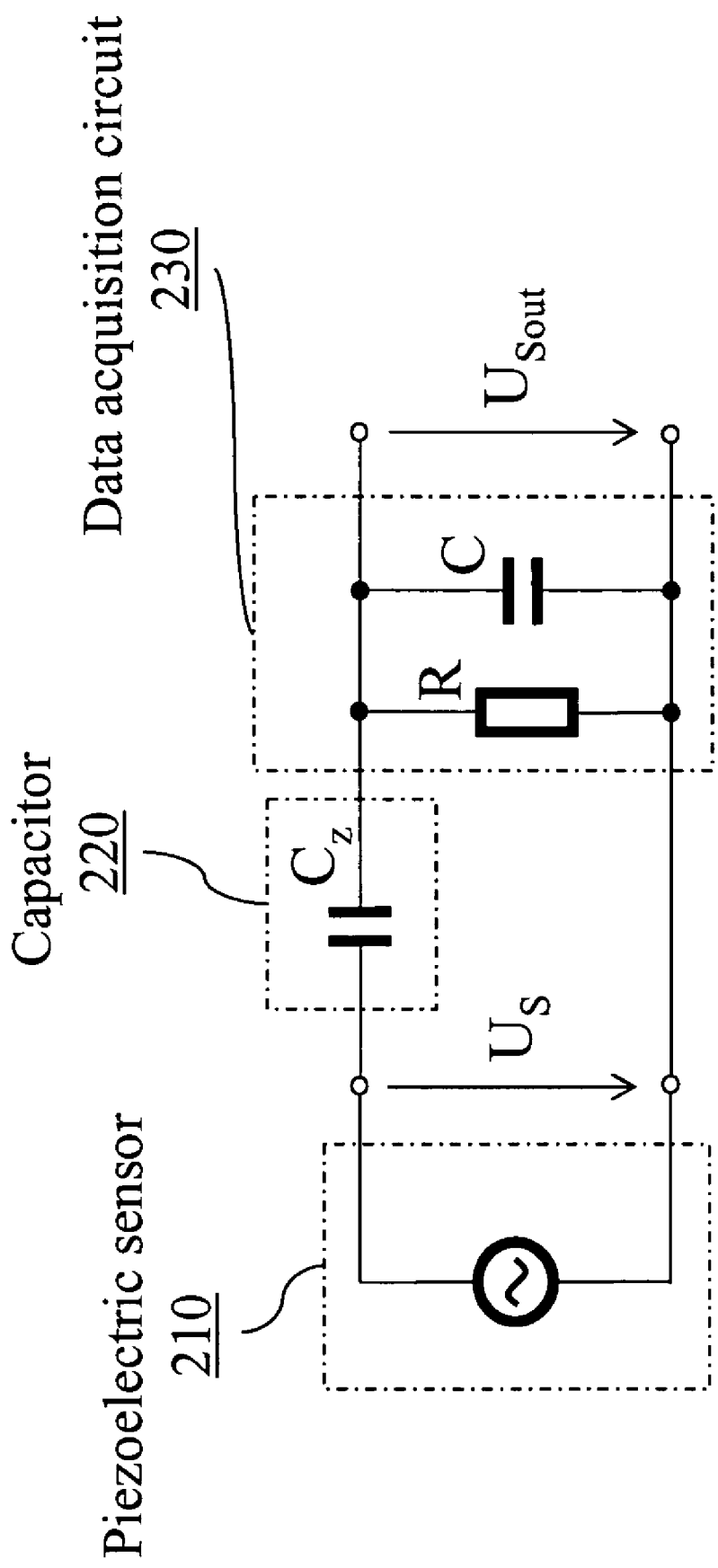
FIG. 2 illustrates a simplified circuit diagram of an exemplary piezoelectric object impact sensor system in accordance with the present invention.

FIG. 2 illustrates a simplified circuit diagram of an exemplary piezoelectric object impact sensor system in accordance with the present invention. The circuit includes a piezoelectric sensor 210, a capacitor 220, and a data acquisition circuit 230. The piezoelectric sensor 210 provides an object detection signal $U_s$, which is higher than limits of sensor electronics. Therefore, the signal $U_s$ is attenuated in order to be adapted to the limits of sensor electronics. The attenuation is achieved by placing capacitor 220 in series with the piezoelectric sensor 210 and the data acquisition circuit 230, which is an RC element. Using this impedance circuitry, the distortion of the output signal $U_{Sout}$ is minimized. The output signal $U_{Sout}$ is used for identifying the type of object impact. Although FIG. 2 illustrates capacitor 220 attenuating the impact detection signal, other types of attenuators may be employed.

Figure 3:
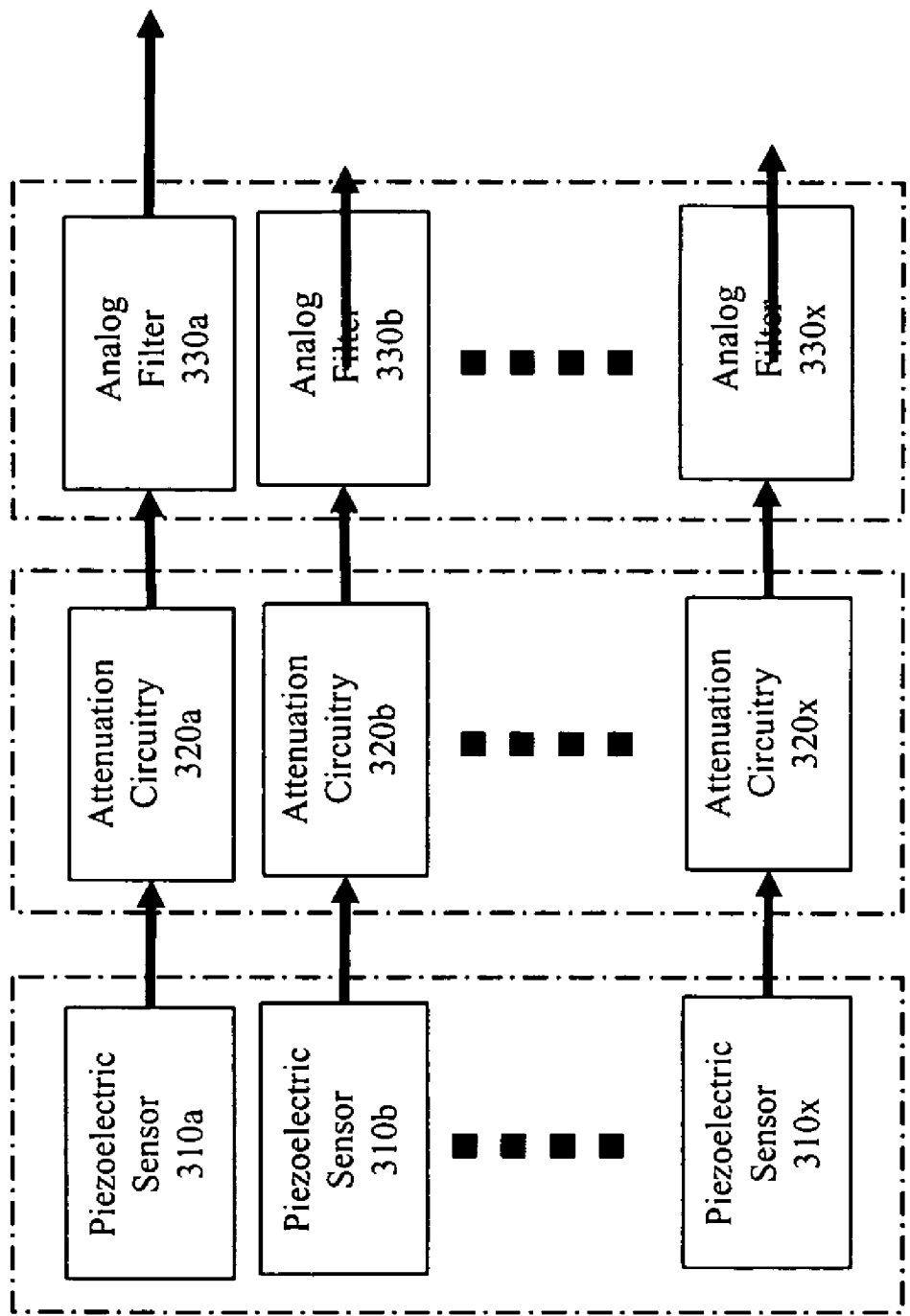
FIG. 3 is a logical representation of the exemplary piezoelectric object impact sensor system in accordance with the present invention.

FIG. 3 is a logical representation of the exemplary piezoelectric impact sensor system in accordance with the present invention. As illustrated in FIG. 3, the exemplary impact sensor includes a plurality of piezoelectric sensor elements 310a-310x. Each of the piezoelectric sensor elements 310a-310x is coupled to a respective attenuation circuit 320a-320x. Each of the attenuation circuits 320a-320x provides an attenuated impact sensor signal to a respective analog filter 330a-330x. The analog filters 330a-330x provide a filtered and attenuated impact sensor signal to the object type identification circuitry (not shown). The analog filters 330a-330x are designed such that they pass those frequencies which are useful for determining whether the impacted object is a pedestrian. In accordance with exemplary embodiments of the present invention, the passband is set to allow signals in the 100 Hz to 20 kHz to pass through the filter.

It should be recognized that the analog filters can be replaced by digital filtering by converting the attenuated signal from an analog waveform into a digital representation of the analog waveform. The digital representation can be filtered by a microprocessor operating under software control, an application specific integrated circuit (ASIC), field programmable gate array (FPGA), or the like.

Figure 4:
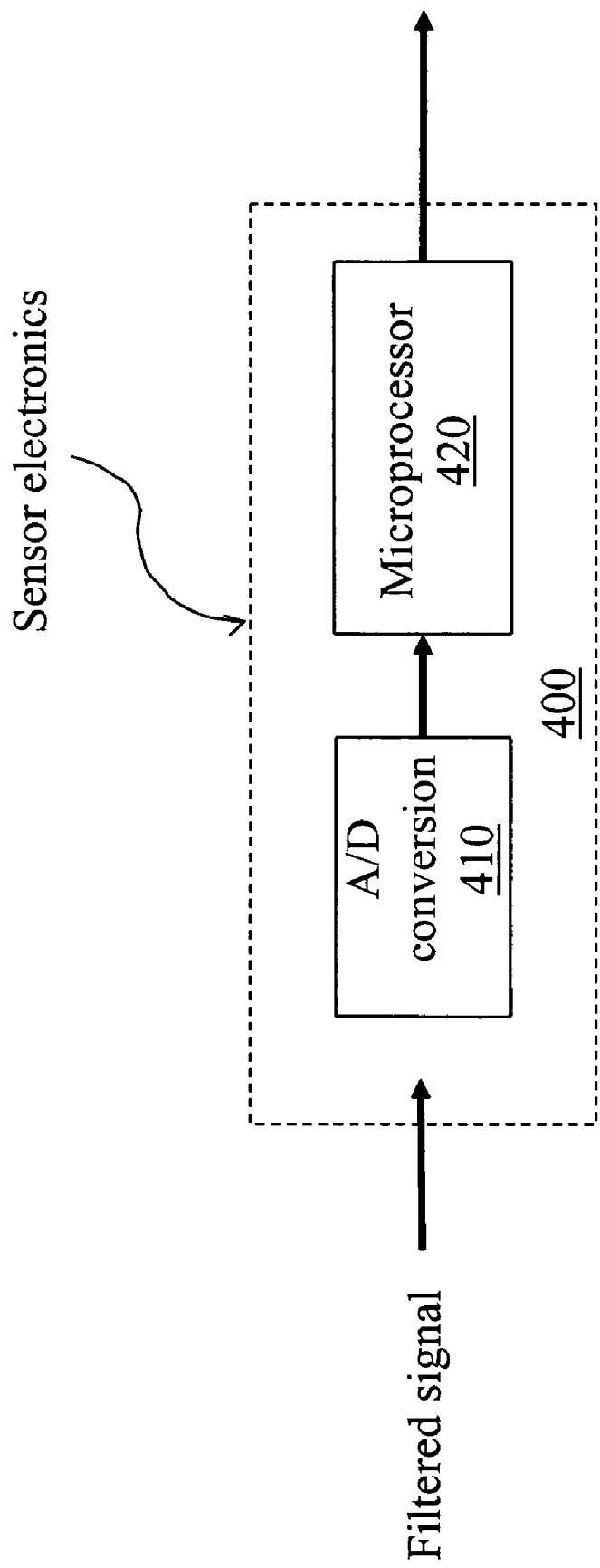
FIG. 4 illustrates an exemplary object type identification circuit in accordance with the present invention.

FIG. 4 illustrates an exemplary object type identification circuit 400 in accordance with the present invention. The object type identification circuit identifies whether an object, which impacted the vehicle, is either a pedestrian or non-pedestrian object. However, the circuit can also be extended to provide more precise identification of non-pedestrian objects.

The circuit 400 receives the filtered signal from the analog filters and converts the analog signal into the digital domain using analog to digital (A/D) converter 410. The digital signal is provided to a microprocessor 420 for analyzing the signal in the frequency domain. In accordance with exemplary embodiments of the present invention, the microprocessor 410 performs under software control to perform the A/D conversion to acquire the data, obtain vehicle information such as the vehicle speed, process the sensor signals, and provide an output signal to an object protection system (not illustrated) for deployment of the object protection system. Microprocessor 420 can be a conventional microprocessor operating under software control, ASIC, FPGA, or the like.

Figure 5:
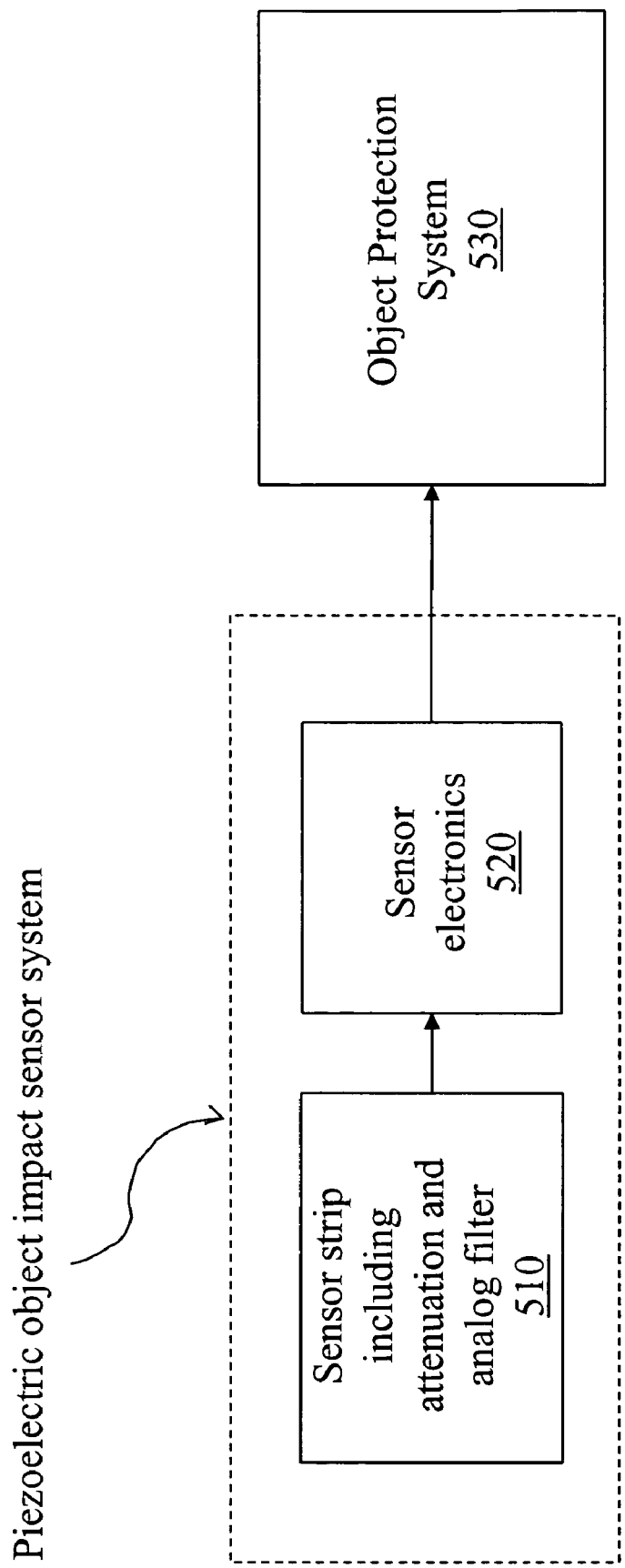
FIG. 5 is a logical representation of the object impact detection system in accordance with exemplary embodiments of the present invention.

FIG. 5 is a logical representation of the object impact detection system in accordance with exemplary embodiments of the present invention. The system includes the sensor strip component 510, sensor electronics 520 and the object protection system 530. The sensor strip component 510 includes the attenuation and filtering circuitry. The output of the sensor electronics 520 is provided directly, or through a communication bus, to the object protection system 530. The object protection system 530 can include a pedestrian airbag which deploys between the vehicle exterior and the pedestrian, a mechanism for shifting the hood to an elevated position, and/or any other system which protects a pedestrian during a vehicle impact. Moreover, the sensor electronics output can be provided to other vehicle safety systems such as airbag electronics or passive restraint electronics.

Figure 6:
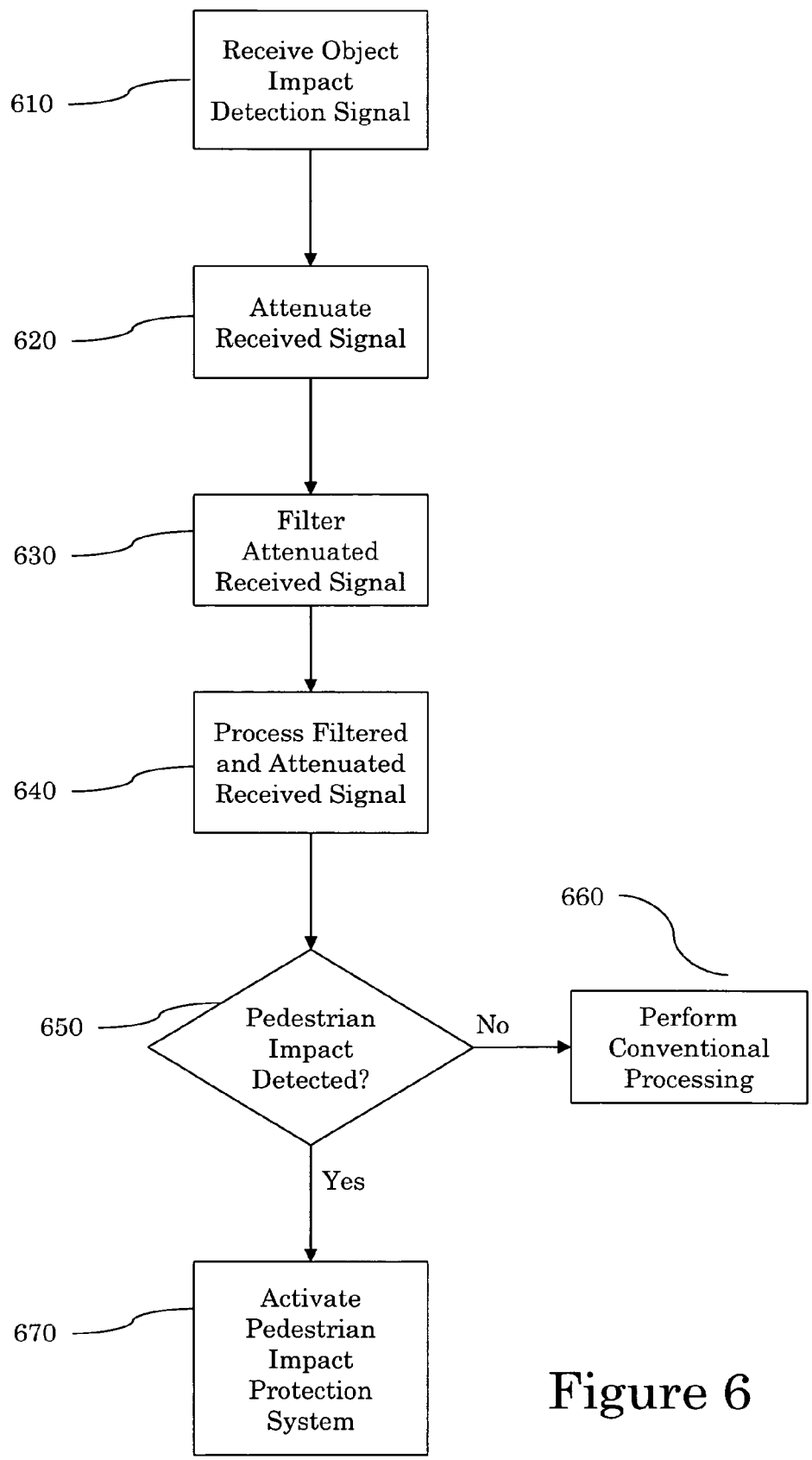
FIG. 6 is an exemplary method for identifying a type of object impact in accordance with exemplary embodiments of the present invention.

FIG. 6 is an exemplary method for identifying a type of object impact in accordance with exemplary embodiments of the present invention. When the piezoelectric sensors are impacted, the system receives an impact detection signal (step 610). The impact detection signal is attenuated (step 620) and filtered (step 630). The attenuated and filtered impact detection signal is then processed to determine whether the impact signal corresponds to a pedestrian impact (step 650). If the impact signal does not correspond to a pedestrian impact ("No" path out of step 650), then conventional processing is performed (step 660). The conventional processing can include performing no further processing, providing the attenuated and filtered signal to other passive restraint systems, providing the original impact detection signal to other passive restraint systems, and/or the like. If, however, a pedestrian impact is detected ("Yes" path out of decision step 650), then the pedestrian impact protection system is activated (step 670).

A variation of the method of FIG. 6 can be to also account for the speed of the vehicle in determining whether to deploy the pedestrian impact protection system. In accordance with this variation, after a pedestrian impact has been detected (step 650), it is determined whether the vehicle is traveling within a predetermined speed value range. This speed value can be provided to the object type identification circuit from a speed sensor. Speed sensors are known in the art. If the vehicle is traveling at a speed which is outside of the predetermined speed value range, then conventional processing is performed (step 660). If, however, the vehicle speed is within the predetermined speed value range, then the pedestrian impact protection system is activated (step 670).

The piezoelectric object type identification system of the present invention provides a number of advantages over conventional systems. For example, the system provides a quick determination of whether the object impact is that of a pedestrian impact. Specifically, the system can detect pedestrian impacts within approximately 8 ms. Non-pedestrian impacts such as car-to-car, rigid barrier, stone impact, styrofoam, plant, traffic sign, pylon, tennis ball, football are filtered out by the analog filters. Accordingly, the detection time for such non-pedestrian impacts is much shorter than 8 ms because there will be no frequencies within the range of frequencies for pedestrian impacts to be processed.

Moreover, the accuracy provided by the present invention in detection of pedestrian impacts protects against improper activation of the pedestrian impact protection system, which can lead to costly repairs for the vehicle owner and may obscure the driver's view. The present invention also provides cost savings in the sensor design by relying upon piezoelectric sensor elements, which are cheaper than other types of sensors such as piezoelectric cable sensors. Additionally, the sensor is easily integrated into a vehicle component, such as a bumper, while taking up minimal space.

While the invention has been described in connection with various embodiments, it will be understood that the invention is capable of further modifications. This application is intended to cover any variations, uses or adaptations of the invention following, in general, the principles of the invention, and including such departures from the present disclosure as known, within the known and customary practice within the art to which the invention pertains.

What is claimed is:

1. A system, comprising:
    a piezoelectric sensor that generates an impact detection signal;
    a filter coupled to the piezoelectric sensor, wherein the filter produces a filtered signal by removing predetermined frequency signals from the impact detection signal received from the piezoelectric sensor and passing approximately an entire range of frequencies that can be used to identify whether a pedestrian impacted the piezoelectric sensor that consists of approximately the entire range of 100 Hz to 20 kHz; and
    an object type identification circuit coupled to the filter, wherein the object type identification circuit identifies whether a pedestrian has impacted on the piezoelectric sensor based on an analysis of the filtered signal.

2. The system of claim 1, further comprising:
    a pedestrian protection system, wherein if the object type identification circuit determines that the pedestrian has impacted on the piezoelectric sensor, then the pedestrian protection system is deployed.

3. The system of claim 2, further comprising:
    a traveling speed sensor, wherein the pedestrian protection system is deployed when the pedestrian has impacted on the piezoelectric sensor and the traveling speed sensor outputs a speed value within a predetermined speed value range.

4. The system of claim 1, wherein the piezoelectric sensor comprises a plurality of piezoelectric sensor elements, and the filter comprises a plurality of filters, each of the plurality of filters is coupled to a respective one of the plurality of piezoelectric sensor elements.

5. The system of claim 1, wherein the piezoelectric sensor is coupled to the filter via an attenuation circuit.

6. The system of claim 1, wherein the filter is coupled to the object type identification circuit via an analog to digital converter, and the object type identification circuit is a digital circuit.

7. The system of claim 1, wherein the piezoelectric sensor is mounted in a vehicle bumper.

8. The system of claim 1, wherein the piezoelectric sensor is embedded in a dielectric layer.

9. A method for identifying a type of object impact, the method comprising the acts of:
receiving an object impact signal;
filtering predetermined frequencies from the object impact signal to produce a filtered signal by removing predetermined frequency signals from the object impact signal and by passing approximately an entire range of frequencies that can be used to identify whether a pedestrian impacted a piezoelectric sensor that consists of approximately the entire range of 100 Hz to 20 kHz;
identifying whether the pedestrian impacted the piezoelectric sensor based on an analysis of the filtered signal.

10. The method of claim 9, further comprising the act of:
attenuating the received object impact signal, wherein the attenuated object impact signal is filtered.

11. The method of claim 9, wherein if it is determined that the pedestrian has impacted, the method further comprises the act of:
activating a pedestrian impact protection system.

12. The method of claim 11, further comprising the acts of:
receiving a traveling speed sensor signal; and
determining whether the traveling speed sensor signal is within a predetermined speed value range, wherein the pedestrian impact protection system is activated only when the traveling speed sensor signal is within the predetermined speed value range and it is determined that the pedestrian has impacted.

13. A system, comprising:
a piezoelectric sensor that generates an impact detection signal; means for filtering the impact detection signal from the piezoelectric sensor to produce a filtered signal by removing predetermined frequency signals from the impact detection signal and by passing approximately an entire range of frequencies that can be used to identify whether a pedestrian impacted the piezoelectric sensor that consists of approximately the entire range of 100 Hz to 20 kHz; and
means for identifying whether a pedestrian has impacted on the piezoelectric sensor based on an analysis of the filtered signal.

14. The system of claim 13, comprising: means for deploying a pedestrian protector if the pedestrian has impacted on the piezoelectric sensor.

15. The system of claim 13, wherein the piezoelectric sensor comprises a plurality of piezoelectric sensor elements, and the means for filtering comprises a plurality of means for filtering, each of the plurality of means for filtering is coupled to a respective one of the plurality of piezoelectric sensor elements.

16. The system of claim 13, wherein the piezoelectric sensor is coupled to the means for filtering via an attenuation circuit.

17. The system of claim 13, wherein the means for filtering is coupled to the means for identifying via an analog to digital converter.

18. The system of claim 13, wherein the piezoelectric sensor is mounted in a vehicle bumper.

* * * * *